United States Patent Office 3,692,729
Patented Sept. 19, 1972

3,692,729
PROCESS FOR THE MANUFACTURE OF INSOLUBLE SYNTHETIC PRODUCTS ON THE BASIS OF EPOXY COMPOUNDS CONTAINING URETHANE GROUPS
Herbert Kolbel, Georg Manecke, and Hussain Kashif El-Ghatta, Berlin, Germany, assignors to Reichhold-Albert-Chemie Aktiengesellschaft, Hamburg, Germany
No Drawing. Filed Sept. 21, 1970, Ser. No. 74,148
Claims priority, application Germany, Sept. 22, 1969,
P 19 47 873.0
Int. Cl. C08f 45/32; C08g 45/04
U.S. Cl. 260—30.4 EP        7 Claims

ABSTRACT OF THE DISCLOSURE

The invention relates to the manufacture of insoluble plastics by reaction of epoxide compounds containing urethane groups with compounds which possess functional groups capable of reaction with epoxide groups, in the presence of unsaturated polymerisable monomers and/or reactive diluents. The epoxide compounds are obtained by reaction of an adduct with at least 2 NCO groups, which is manufactured from a polyisocyanate or diisocyanate and a compound with at least 2 hydroxyl groups, and compounds which contain one hydroxyl group and one epoxide group.

BACKGROUND OF THE INVENTION

Epoxide compounds which are manufactured by reaction of a diisocyanate (for example toluylenediisocyanate and the like) with glycidol in a molar ratio of 1:2, have already been described (A.A. Berlin and Dabagova, Vysokomolekulyarny Soedinenya 1, 946–50 (1959) and German Pat. 862,888).

Furthermore it is known to react a mixture of heat-curable epoxide compounds and monomeric polymerisable compounds, which are free of epoxide groups and possess a reactive double bond, with polybasic non-polymerisable carboxylic acids or their anhydrides in an amount of at least 20%, relative to the mixture, and optionally in the presence of polymerisation catalysts, at elevated temperature and with shaping, to give alkali-resistant and solvent-resistant plastics. Particularly suitable epoxide compounds are the reaction products of polyhydric phenols, for example bisphenol A (2,2 - bis-(4-hydroxy-phenyl)-propane) with epichlorhydrin, and also epoxide compounds based on alcohols (German Pat. 970,975).

Polyurethane-diglycidyl-ethers are furthermore known which are manufactured via the monochlorhydrinether of the diol, the dehydrohalogenation to give the mono-glycidyl-ether-alcohol, and its reaction with diisocyanate, optionally with polyether-alcohols simultaneously being present (see Jellineck, Advances in the Field of Plasticisation of Aromatic and Cycloaliphatic Epoxide Resins, 2nd International Conference on Glass Fibre-Reinforced Plastics and Casting Resins in Berlin, Mar. 13 thru 18, 1967).

Polyurethane-diglycidyl-ethers which can be manufactured from 1 mol of polyalkylene-ether-glycol, 2 mols of organic diisocyanates and 2 mols of a component which possesses one hydroxyl group and one epoxide group, are known from U.S.A. patent specification 2,830,038. The plastics obtained therefrom by reaction with curing agents have inadequate heat resistance. Their softening ranges are in the area of room temperature. The low molecular polyhydric alcohols or phenols, or diols or bisphenols, could not be used in place of the polyalkylene-ether-glycol, since the conversion of the resulting epoxide compounds into synthetic resins by means of customary curing agents fails because of the curing reactions taking place very rapidly and the crosslinking of the mixture of epoxide compound and curing agent beginning too rapidly. The considerable exothermicity of the reaction causes an excessively strong temperature rise, so that the further processing becomes difficult or impossible. Products containing bubbles, which are industrially not utilisable, are obtained.

SUMMARY OF THE INVENTION

The invention is based on the task of making possible the conversion of epoxide compounds based on adducts with at least two —NH.CO groups, which have been manufactured from polyisocyanates or diisocyanates and polyfunctional alcohols or phenols, and compounds which contain at least one hydroxyl group and one epoxide group, to give synthetic resins having good mechanical and thermal properties.

This aim is achieved by the process according to the invention for the manufacture of insoluble plastics by reacting epoxide compounds which possess at least two epoxide groups in the molecule, with compounds which possess functional groups capable of reaction with epoxide groups. It is characterised in that compounds possessing at least two —NH.CO groups, which have been obtained by reaction of adducts of diisocyanates or polyisocyanates and compounds with at least two hydroxyl groups from the group of the polyfunctional alcohols and phenols, with compounds with at least one hydroxyl group and at least one epoxide group, are used as epoxide compounds, and that the reaction is carried out in the presence of 30–150% by weight of at least one polymerisable monomer and/or of 20–60% by weight of a reactive diluent, in each case relative to the weight of the epoxide compound.

The reaction can be carried out in the presence of a polymerisation initiator. Suitable initiators are for example tri - (dimethylaminomethyl)-phenol, potassium persulphate, dibenzoyl peroxide, cumene hydroperoxide, cyclohexanone peroxide, di-t-butyl peroxide and azodi-isobutyronitrile.

In this ideal case, the epoxide compounds used to obtain the plastics according to the invention correspond to the formula

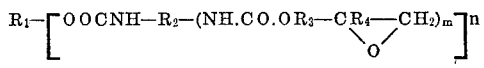

In this formula:

$R_1$ denotes saturated or unsaturated aliphatic radicals with 2 to 19 C atoms, radicals derived from polyalkylene glycols, or aromatic, cycloaliphatic or heterocyclic radicals with 1 to 4 rings, which can optionally be substituted by alkyl groups with 2 to 10 C atoms, $R_2$ denotes aliphatic radicals, especially with 4 to 10 C atoms, or cycloaliphatic, aromatic, araliphatic, alkylaromatric or heterocyclic radicals with 1 to 4 rings, which can optionally be substituted by alkyl or alkoxy groups with 1 to 15 C atoms, urethane groups, carbamide groups or halogen atoms, it being possible for these rings to belong to condensed or non-condensed systems, $R_3$ denotes alkylene radicals with 1 to 4 C atoms, or radicals of glycidyl esters of hydroxy-acids, as well as monoglycidyl-ethers of polyhydric alcohols, or phenols, $R_4$ denotes hydrogen or lower alkyl radicals, especially with 1 to 4 atoms, and $m$ is 1 to 3, and $n$ is 2 to 5.

The adducts with terminal-NCO groups employed for the manufacture of the epoxide compounds are preferably obtained from one mol of a compound with 2 hydroxyl groups and 2 mols of a diisocyanate.

To illustrate the method of manufacture of the epoxide compounds employed, the manufacture of an epoxide compound from bifunctional derivatives (diisocyanate, diol or bisphenol) and a compound which contains an epoxide group and a hydroxyl group (for example glycidol) is explained below:

Two mols of a diisocyanate are reacted with one mol of diol or bisphenol to give an adduct with terminal-NCO groups, in a known manner. The reaction of the adduct with terminal-NCO groups with two mols of glycidol is preferably carried out in the presence of solvents (for example benzene). The reaction temperature should be not higher than 110° C. (preferably 80° C.).

The reaction carried out all take place quantitatively.

As isocyanate components, aliphatic and cycloaliphatic as well as aromatic diisocyanates or polyisocyanates, or combinations of these types are used. The cyclic compounds here include both condensed and noncondensed systems. In the latter, several rings can be linked to one another by heteroatoms or polyfunctional groups. At the same time it is also possible to employ mixtures of two or more diisocyanates or polyisocyanates, and also polyurethanes with excess-NCO groups, for example phenylene-1,4-diisocyanate,
toluylene-2,4-diisocyanate,
toluylene-2,6-diisocyanate,
3,3'-bis-toluylene-4,4'-diisocyanate,
3,3'-dichloro-diphenyldiisocyanate,
3,3'-dimethoxy-4,4'-diphenyl-diisocyanate,
4,4'-dimethyl-3,3'-diisocyanato-diphenylurea,
3,3'-dimethyl-4,4'-diphenyldiisocyanate,
4,4'-diphenyldiisocyanate,
4,4'-diphenylmethane-diisocyanate,
hexamethylene-1,6-diisocyanate,
1-methyl-2,6-phenyldiisocyanate,
1-methyl-2,4-phenylenediisocyanate,
naphthalene-1,5-diisocyanate,
octadecyl-diisocyanate,
phenyl-urethanediisocyanate,
2,4,4'-diphenyl-ether-triisocyanate,
triphenylmethane-4,4',4''-triisocyanate,
trimethyl-hexamethylene-diisocyanate, and
3-isocyanatomethyl-3,5,5-trimethyl-cyclohexyl-isocyanate.

Suitable saturated and unsaturated polyhydric alcohols for the manufacture of the epoxide compounds employed according to the invention are alkanediols with up to 19 C atoms, for example ethylene glycol, alkenediols, such as for example butenediols, hexenediols, dialkylene glycols and polyalkylene glycols, especially diethylene glycol, polyethylene glycols (molecular weight up to approx. 800), 1,4-bis-(hydroxymethyl)-cyclohexane, 1,4-bis-(hydroxymethyl)-benzene, bis - (hydroxymethyl) - tricyclodecane (commercially available as TCD-diol), glycerine, pentaerythritol and mannitol. Furthermore, it is possible to employ Diels-Alder adducts with more than one OH group in the molecule, such as for example anthracene-endo-butanediol, and dichloranthracene-endo-butanediol. At the same time it is also possible to employ mixtures of two or more diols or polyhydric alcohols.

As suitable polyhydric phenols for the manufacture of the epoxide compounds employed according to the invention it is for example possible to use hydroquinone, resorcinol, bisphenol A, tetrabromobisphenol A, 4,4'-dihydroxy-diphenyl, 1,7-dihydroxynaphthalene, 1,6-dihydroxynaphthalene, 1,5-dihydroxynaphthalene, 2,3-dihydroxynaphthalene, and 2,7-dihydroxynaphthalene. At the same time it is also possible to employ mixtures of two or more bisphenols or polyhydric phenols.

As compounds with at least one hydroxyl group and one epoxide group, glycidol, 2-methylglycidol, glycidyl esters of hydroxycarboxylic acids, such as for example lactic acid, glycollic acid, hydroxypivalic acid, 4-($\beta$-hydroxyethoxy)-benzoic acid, 3 - chloro - 4 - ($\beta$ - hydroxyethoxy)-benzoic acid and also monoglycidyl-ethers of the above-mentioned polyhydric alcohols or phenols, preferably of the diols or bisphenols, can for example advantageously be used.

As unsaturated polymerisable monomeric compounds, it is possible, in particular to use isocyclic and heterocyclic vinyl compounds such as styrene, methylstyrene, divinylbenzene or vinylcarbazole, and also unsaturated hydrocarbons, ketones, ethers, carboxylic acids and their derivatives, for example 2-chlorobutadiene-(1,3), vinyl methyl ketone, vinyl phenyl ether, acrylic acid, acrylic acid esters, acrylonitrile, methacrylic acid, methacrylic acid esters, methacrylonitrile, $\alpha$-chloracrylic, $\alpha$-chloracrylic esters, vinylacetic acid, vinylacetonitrile and vinyl acetate. Styrene is preferentially employed.

Amongst the large number of reactive diluents known in the epoxide field, phenyl-glycidyl-ether, i-nonyl-glycidyl-ether, 2-ethylhexyl-glycidyl-ether and glycidol have proved particularly suitable.

Suitable compounds which possess functional groups capable of reaction with epoxide groups, so-called curing agents, are especially dicarboxylic acids or polycarboxylic acids or their anhydrides, for example maleic anhydride, succinic anhydride, phthalic anhydride, hexahydrophthalic anhydride, isooctenylsuccinic anhydride, pyromellitic anhydride and anthracene-endosuccinic anhydride Furthermore the reaction can be carried out with other curing agents, for example basic curing agents which are in themselves known (see Houben-Weyl, Volume 14/2, page 516 and thereafter). These curing agents are employed in amounts of 50 to 150%, preferably about 90%, of the stoichiometrically required amount of curing agent.

The following advantages are achieved by the process according to the invention:

(1) The mixture of (1) epoxide compound, (2) curing agent, (3) at least 30% by weight of unsaturated polymerisable monomeric compound and (4) at least 20% by weight of reactive diluent (percent by weight relative to the epoxide compound) has a long pot life and a casting temperature of 60 to 70° C., and is of such low viscosity, that it is very easy to process.

(2) The mouldings manufactured according to the process of the invention are bubble-free and are distinguished by superior good mechanical and thermal properties.

(3) As a result of the process according to the invention, a large number of new types of synthetic resins with a very broad scale of mechanical and thermal properties become available, the properties depending on the starting components used (polyisocyanates and diisocyanates, polyhydric alcohols or phenols as well as diols or bisphenols, compounds with one hydroxyl group and one epoxide group, basic and acid curing agents, unsaturated polymerisable monomeric compounds and reactive diluents). As a result of the large number of the starting components, there are very many possible combinations.

The resin compositions according to the invention are suitable for use as casting, impregnating and laminating resins, especially in the electrical industry; as constituents of binders, above all of adhesives and synthetic resin mortars, components of coating compositions, especially in the building industry, lacquer raw materials for the manufacture of particularly chemically resistant lacquers and as components of solvent-free lacquer systems, casting compositions, amongst others in mould construction and tool construction, and foams. They can contain known additives, such as for example fillers, colorants or plasticisers, in the amounts which are customary for these.

The examples which follow are intended to explain the invention in more detail:

EXAMPLE 1

(A) Preparation of the epoxide resin 1

22.8 g. of bisphenol A (0.1 mol) and 34.8 g. of toluylenediisocyanate (0.2 mol) are heated in 80 ml. of benzene, whilst stirring, until the mixture refluxes vigorously. Thereafter 14.8 g. of glycidol (0.2 mol) are added dropwise. The reaction mixture is kept under reflux for a further hour. The epoxide resin is freed of benzene. A colourless, crystalline product with an epoxide value of 2 mequi./g. and a softening point of 70 to 80° C. is obtained.

Yield: 72.4 g. of epoxide resin 1.

The epoxide resin 1 can be formulated as follows:

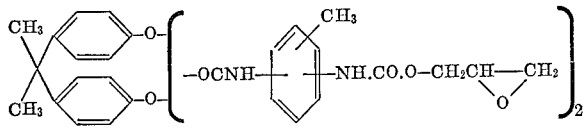

(B) Production of the insoluble plastic

20% by weight of maleic anhydride, 30% by weight of styrene and 20% by weight of glycidol (percent by weight relative to the epoxide resin 1 employed) are added to the epoxide resin 1. The mixture is heated to 70–80° C. and is poured into appropriate moulds.

The samples are cured for 2 hours at 90° C.+2 hours at 120°C.+20 hours at 180° C. The cured samples have a heat distortion point according to Martens of 106° C., an impact strength (DIN 53,453) of 6 kp. cm./cm.$^2$, a flexural strength (DIN 53,452) of 720 kp./cm.$^2$ and a ball indentation hardness of 1540 kp./cm.$^2$.

EXAMPLE 2

20% by weight of maleic anhydride and 30% by weight of phenyl-glycidyl-ether (percent by weight relative to the epoxide resin 1) are added to the epoxide resin 1. The mixture is heated to 70–80° C. and poured into appropriate moulds. The samples are cured for 2 hours at 90° C. +2 hours at 120° C.+20 hours at 180° C. The cured samples have a heat distortion point according to Martens of 95° C.

EXAMPLE 3

10 g. of epoxide resin 1 are dissolved in 50 ml. of a mixture of equal parts of acetone/chloroform. 3 g. of i-nonyl-glycidyl-ether and 4.36 g. of isooctenyl-succinic anhydride are added to the solution. Twice descaled deep-drawing sheet metal of 0.5 mm. thickness is sandpapered, degreased and repeatedly dipped into the solution. After 30 minutes air drying the lacquer coatings are pre-cured for 1 hour at 70° C. and cured for 8 hours at 120° C. The finished films show the highest ratings in the mandrel bending test and in the cross-cut test. On bending over the smallest mandrel (2 mm.) no damage of the film is detectable. The cross-cut test gives a rating of Gt O B according to DIN 53,151, draft of May 64. The film thickness is 20µ and the pencil hardness 8H. The films are colourless and transparent.

EXAMPLE 4

(A) Preparation of the epoxide resin 2

8.8 g. of butenediol (0.1 mol) and 34.8 g. of toluylene-diisocyanate (0.2 mol) are heated in 80 ml. of benzene, whilst stirring, until the mixture refluxes vigorously. Thereafter 14.8 g. of glycidol (0.2 g.) are added dropwise. The reaction mixture is kept for a further hour under reflux. The epoxide resin 2 is freed of benzene. A colourless crystalline product with an epoxide value of 2.2 mequi./g. and a softening point of 60 to 70° C. is obtained.

Yield: 58.4 g. of epoxide resin 2.

The epoxide resin 2 can be formulated as follows:

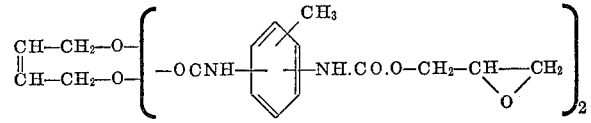

(B) Production of the insoluble plastic

20% by weight of maleic anhydride, 100% by weight of styrene and 20% by weight of phenyl-glycidyl-ether (percent by weight relative to the epoxide resin 2) are added to the epoxide resin 2. The mixture is heated to 70–80° C. and poured into appropriate moulds. The samples are cured for 2 hours at 90° C.+2 hours at 120° C. +20 hours at 180° C. The cured samples have a heat distortion point according to Martens of 128° C., an impact strength (DIN 53,453) of 5 kp. cm./cm.$^2$, a flexural strength (DIN 53,452) of 710 kp./cm.$^2$ and a ball indentation hardness of 1595 kp./cm.$^2$.

From the examples and the resin formulations given above it is obvious that, apart from the new epoxide compounds, residues of unreacted or only partly reacted raw materials, byproducts, and compounds of higher molecular weight may be present. These however do not interfere with the commercial use of the reaction products and with the conversion to the plastics.

While this invention has been described with reference to certain specific embodiments, it will be recognized by those skilled in the art that many variations are possible without departing from the scope and spirit of the invention.

We claim:

1. Process for the manufacture of insoluble plastics by reaction of epoxide compounds possessing at least two epoxide groups in the molecule with compounds possessing functional groups capable of reaction with epoxide groups, characterized in that a compound selected from the group consisting of

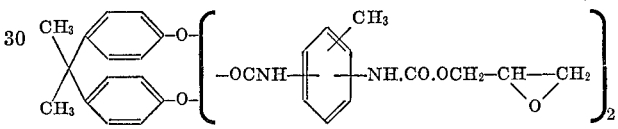

and

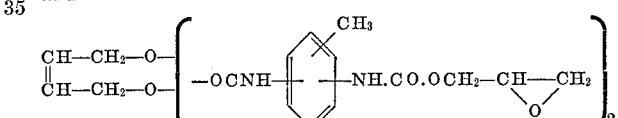

is employed as the epoxide compound and that the reaction is carried out in the presence of 30–150% by weight, relative to the epoxide compound, of at least one polymerizable monomer or in the presence of 20–60% by weight, relative to the epoxide compound, of a reactive diluent selected from the group consisting of phenyl-glycidyl-ether, i-nonyl-glycidyl-ether, 2-ethylhexyl-glycidyl-ether and glycidol or in the presence of both said polymerizable monomer and said reactive diluent.

2. Process according to claim 1, characterised in that the reaction is carried out in the presence of a polymerisation initiator.

3. Process according to claim 1, characterised in that dicarboxylic acids or polycarboxylic acids or their anhydrides are employed as compounds with functional groups capable of reaction with epoxide compounds.

4. Process according to claim 1, characterised in that styrene is employed as the unsaturated polymerisable compound.

5. Process according to claim 1, characterised in that glycidol is employed as the reactive diluent.

6. An epoxide compound of the formula

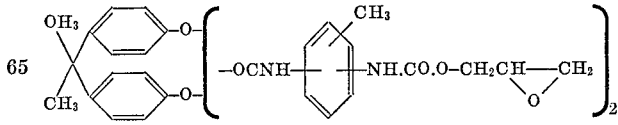

7. An epoxide compound of the formula

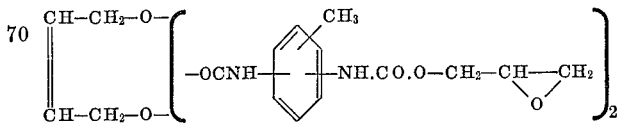

(References on following page)

References Cited

UNITED STATES PATENTS

| | | | |
|---|---|---|---|
| 3,484,413 | 12/1969 | Kaufman | 260—77.5 |
| 2,735,829 | 2/1956 | Wiles | 260—30.4 |
| 2,830,038 | 4/1958 | Pattison | 260—77.5 |
| 3,009,898 | 11/1961 | Meyer | 260—837 |
| 3,099,638 | 7/1963 | Foster | 260—837 |
| 3,440,230 | 4/1969 | Doss | 260—77.5 |
| 3,445,436 | 5/1969 | Lake | 260—75 |

FOREIGN PATENTS

| | | | |
|---|---|---|---|
| 772,694 | 4/1957 | Great Britain | 260—836 |

PAUL LIEBERMAN, Primary Examiner

U.S. Cl. X.R.

260—47 Ep, 75 NP, 77.5 AM, 830 P, 836